United States Patent
Jallon

(10) Patent No.: US 8,254,497 B2
(45) Date of Patent: Aug. 28, 2012

(54) METHOD FOR DETECTING CYCLOSTATIONARY SIGNALS

(75) Inventor: Pierre Jallon, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 238 days.

(21) Appl. No.: 12/669,445

(22) PCT Filed: Jul. 17, 2008

(86) PCT No.: PCT/EP2008/059397
§ 371 (c)(1),
(2), (4) Date: Jan. 15, 2010

(87) PCT Pub. No.: WO2009/010564
PCT Pub. Date: Jan. 22, 2009

(65) Prior Publication Data
US 2010/0195705 A1    Aug. 5, 2010

(30) Foreign Application Priority Data
Jul. 17, 2007  (FR) ..................... 07 56530

(51) Int. Cl.
*H04L 27/00* (2006.01)
*H03K 9/00* (2006.01)

(52) U.S. Cl. ......... 375/316; 375/260; 375/324; 375/340

(58) Field of Classification Search .................. 375/316, 375/324, 340, 260
See application file for complete search history.

(56) References Cited

U.S. PATENT DOCUMENTS

| | | | | |
|---|---|---|---|---|
| 5,260,968 | A | * | 11/1993 | Gardner et al. ............... 375/347 |
| 6,898,235 | B1 | * | 5/2005 | Carlin et al. .................. 375/219 |
| 7,720,187 | B2 | * | 5/2010 | Mo et al. ...................... 375/365 |
| 2008/0211719 | A1 | * | 9/2008 | Zhang et al. .................. 342/418 |

OTHER PUBLICATIONS

Jallon et al., "Second-order based cyclic frequency estimates: the case of digital communication signals", IEEE International Conference of Acoustics, Speech and Signal Processing, May 14, 2006, pp. IV-349-IV-392, New York, US.

(Continued)

*Primary Examiner* — Ted Wang
(74) *Attorney, Agent, or Firm* — Nixon Peabody LLP

(57) ABSTRACT

A method for detecting a cyclostationary signal in a signal to be analyzed, received from a transmitter by a receiver or read from a recording medium by a reader device. According to this method, the value of a discrimination function J is estimated, expressed as a quadratic form of the cyclic correlation coefficients of the signal to be analyzed for a set $(I^*_M)$ of non-zero time shifts and a set $(I_K)$ of cyclic frequencies, and the value $$1 - \gamma\left(v, \frac{U}{\sigma^4}J\right)$$

is compared with a wrong detection rate $\eta$ in order to determine whether said cyclostationary signal is present in the signal to be analyzed, wherein $\gamma(v,x)$ is the normalized lower incomplete gamma function, $v$ is the product of the cardinal (M) of said set of non-zero time shifts and of the cardinal (K) of said set of cyclic frequencies, U is the width of the auto-correlation window on which the cyclic correlation coefficients are calculated, and $\sigma^4$ is the square of the noise variance.

12 Claims, 4 Drawing Sheets

OTHER PUBLICATIONS

Oner et al., "Air interface recognition for a software radio system exploiting cyclostationarity", IEEE International Symposium on Personal Indoor and Mobile Radio Communications, Sep. 5, 2004, vol. 3, pp. 1947-1951, Piscataway, US.

Mitola, "Cognitive radio—an integrated agent architecture for software defined radio", Royal Institute of Technology, dissertation, May 8, 2000, Stockholm, SE.

Gardner et al., "Cyclic spectral analysis for signal detection and modulation recognition", IEEE Military Communications Conference, Oct. 23, 1988, pp. 419-424, New York, US.

Halford et al., "New-user identification in a CDMA system", IEEE Transactions on Communications, Jan. 1998, vol. 46, No. 1, pp. 144-155, Piscataway, US.

International Search Report for PCT/EP2008/059397 dated Dec. 22, 2008.

Oner et al., "Cyclostationarity based air interface recognition for software radio systems" Proc. of the 15th IEEE International Symposium on Personal Indoor and Mobile Radio Communications, Sep. 2004, pp. 1947-1951.

Gomes, L. et al. "Cyclostationarity-based audio watermarking", Journal Traitement du Signal, 2001, vol. 19, No. 1, pp. 1-9.

* cited by examiner

US 8,254,497 B2

METHOD FOR DETECTING CYCLOSTATIONARY SIGNALS

CROSS REFERENCE TO RELATED APPLICATIONS OR PRIORITY CLAIM

This application is a national phase of International Application No. PCT/EP2008/059397, entitled, "METHOD OF DETECTING CYCLO-STATIONARY SIGNALS", which was filed on Jul. 17, 2008, and which claims priority of French Patent Application No. 07 56530, filed Jul. 17, 2007.

TECHNICAL FIELD

The present invention relates to the detection of cyclostationary signals. It finds application in fields as varied as that of cognitive radio systems, that of antenna processing or radio watermarking.

STATE OF THE PRIOR ART

The increasingly large congestion of the spectrum has led to the consideration of telecommunications systems capable of coexisting with system having already allocated frequency bands, so-called primary systems. Two coexistent strategies are presently the subject of significant research. The first consists of using a very low signal level by very strongly spreading out the spectrum, this is the way followed by ultra wide band systems further called UWB (Ultra Wide Band). The second consists of opportunistically using a portion of the spectrum which is punctually or temporarily unoccupied, this is the so-called opportunistic radio (or Cognitive Radio) way. A description of cognitive radio will be found in the founding thesis of J. Mitola entitled <<Cognitive radio: an integrated agent architecture for software defined radio>>, Royal Institute of Technology, Stockholm, PhD Dissertation, May 8, 2000.

In order to be able to transmit in a given band, a transmitter has to be able to determine whether a radio signal, notably a TDMA (Time Division Multiple Access) signal such as GSM signal, or a spectrally spread signal of the CDMA (Code Division Multiple Access) type or further a OFDM (Orthogonal Frequency Division Multiplexing) signal is present in this band. Given that the spreaded signal may be buried in noise, with a simple power detector it is not possible to obtain this information reliably.

Generally a distinction is made between blind detection methods for which no a priori information on the signal, the presence of which is intended to be detected, is available, and estimation methods of the semi-blind type for which certain parameters of the signal to be detected are known.

A method for semi-blind detection of the presence of a TDMA, CDMA or OFDM signal from a criterion of cyclostationarity was described in the article of M. Öner et al. entitled <<Cyclostationarity based air interface recognition for software radio systems>> published in Proc. of the 15$^{th}$ IEEE International Symposium on Personal, Indoor and Mobile Radio Communications, September 2004, pp. 1947-1951. More specifically, with this method, from the autocorrelation function of the received signal, it is possible to test whether the latter has a cyclic frequency characteristic of a predetermined radio interface.

This method however only operates in a blind context. Further, even in a semi-blind context, when the signal to be detected may assume different values of transmission parameters, for example a CDMA signal which may have different spectral spreading factors, it is not possible with this method to obtain a predetermined false alarm rate or CFAR (Constant False Alarm Rate).

The detection of cyclostationary signals is used in very diverse fields, for example that of radio watermarking. The watermark is a signal of very low power which is inserted into an audio signal in order to introduce hidden data therein, notably with the purpose of tracking illegal copies. The article of L. de C. T. Gomes et al. entitled <<Tatouage audio exploitant des propriétés de cyclostationarité>> published in the journal Traitement du Signal, 2001, Vol. 19, No. 1, pp. 1-9, proposes a cyclostationary tattouing signal coding hidden data by means of a watermarking of cyclic frequencies. Public detection of audio watermarking is carried out by means of detection of said cyclic frequencies in the audio signal. However, this detection method does not allow determination, for a wide variety of audio signals, of whether radio watermarking is present with a predetermined false alarm rate.

The object of the present invention is to propose a robust method with which it is possible to determine with a predetermined reliability level, in a blind or semi-blind context, whether a cyclostationary signal is present in a received or read signal, this for low signal-to-noise ratio conditions.

DISCUSSION OF THE INVENTION

The present invention is defined, according to a first embodiment, by a method for detecting a cyclostationary signal in a signal to be analyzed, received from a transmitter by a receiver or read from a recording medium by a reading device, in which the value of a discrimination function J expressed as a quadratic form of the cyclic correlation coefficients of the signal to be analyzed is estimated for a set of non-zero time shifts and a set of cyclic frequencies, and the value $$1 - \gamma\left(v, \frac{U}{\sigma^4} J\right)$$

is then compared with a wrong detection rate $\eta$ in order to determine whether said cyclostationary signal is present in the signal to be analyzed, wherein $\gamma(v,x)$ is the lower normalized incomplete gamma function, $v$ is the product of the cardinal of said set of non-zero time shifts and of the cardinal of said set of cyclic frequencies, U is the width of the autocorrelation window on which the cyclic correlation coefficients are calculated, and $\sigma^4$ is the square of the noise variance.

According to one alternative, said set of cyclic frequencies is reduced to the zero frequency and the value of the discrimination function is calculated by:

$$J = \sum_{m \in I_M^*} |R_s^0(m)|^2$$

wherein $R_s^0(m)$ is the value of the autocorrelation function of the signal to be analyzed for a non-zero time shift $m \in I^*_M$, and $I^*_M$ being said set of non-zero time shifts. Advantageously, the value of the autocorrelation function may be estimated from samples s(u) of the signal to be analyzed by:

$$\hat{R}_s^0(m) = \frac{1}{U}\sum_{u=0}^{U-1} s(u+m)s^*(u)$$

wherein U is the width of the correlation window and m is a time shift expressed as a number of sampling periods.

According to a second alternative, the discrimination function is calculated by $$J = \left\|\tilde{A}^{-\frac{1}{2}} R\right\|^2$$

wherein R is the vector of size ν consisting of the cyclic correlation coefficients $R_s^{\alpha_k}(m)$ for said non-zero time shifts and said cyclic frequencies, and $\tilde{A}$ is a matrix proportional to the correlation matrix of these coefficients.

According to a third alternative, the discrimination function may be calculated by:

$$J = \sum_{m \in I_M^*} \sum_{\alpha_k \in I_K} |R_s^{\alpha_k}(m)|^2$$

wherein $R_s^{\alpha_k}(m)$, $m \in I^*_M$ are the cyclic correlation coefficients, $I^*_M$ is said set of non-zero time shifts and $I_K$ is said set of cyclic frequencies. Advantageously, the cyclic correlation coefficients may be estimated from the samples s(u) of the signal to be analyzed by:

$$\hat{R}_s^{\alpha_k}(m) = \frac{1}{U}\sum_{u=0}^{U-1} s(u+m)s^*(u)e^{2i\pi\alpha_k u}$$

wherein $\alpha_k$ is a cyclic frequency belonging to $I_K$ and m is a time shift, expressed as a number of sampling periods.

The invention is also defined according to a second embodiment by a method for detecting a cyclostationary signal in a plurality Q of signals to be analyzed, received from a transmitter by a plurality of receivers or read from a recording medium by a plurality of reading devices, in which, for each of said signals to be analyzed, the value of a discrimination function $J_q$ expressed as a quadratic form of the cyclic correlation coefficients of this signal for a set of non-zero time shifts and a set of cyclic frequencies is estimated, and the value $$1 - \gamma\left(\sum_{q=1}^Q v_q, \sum_{q=1}^Q \frac{U_q}{\sigma_q^4} J_q\right)$$

is compared with a wrong detection rate η in order to determine whether said cyclostationary signal is present in said signal to be analyzed, wherein γ(ν,x) is the normalized lower incomplete gamma function, $v_q$ is the product of the cardinal of said set of non-zero time shifts and of the cardinal of said set of cyclic frequencies for the signal to be analyzed $s_q(t)$, $U_q$ is the width of the autocorrelation window on which the cyclic correlation coefficients are calculated and $\sigma_q^4$ is the square of the noise variance, relative to the signal to be analyzed.

According to first alternative, for each of said signals to be analyzed, said set of cyclic frequencies is reduced to the zero frequency and the value of the discrimination function is calculated, for this signal, by:

$$J_q = \sum_{m \in I^*_{M_q}} |R_{s_q}^0(m)|^2$$

wherein $R_{s_q}^0(m)$ is the value of the autocorrelation function of the signal to be analyzed $s_q(t)$, for a non-zero time shift $m \in I^*_{M_q}$, $I^*_{M_q}$ being said set of non-zero time shifts for this signal. Advantageously, for each of said signals to be analyzed, said value of the autocorrelation function may be estimated from the samples s(u) of this signal by:

$$\hat{R}_{s_q}^0(m) = \frac{1}{U}\sum_{u=0}^{U-1} s_q(u+m)s_q^*(u)$$

wherein U is the width of the autocorrelation window and m is a time shift expressed as a number of sampling periods.

According to a second alternative, for each signal $s_q(t)$ to be analyzed, the discrimination function is calculated by:

$$J_q = \left\|\tilde{A}_q^{-\frac{1}{2}} R_q\right\|^2$$

wherein $R_q$ is the vector of size $v_q$ consisting of the cyclic correlation coefficients $R_{s_q}^{\alpha_k}(m)$ for said non-zero time shifts and said cyclic frequencies, and $\tilde{A}_q$ is a matrix proportional to the correlation matrix of these coefficients.

According to a third alternative, for each signal $s_q(t)$ to be analyzed, the discrimination function is calculated by:

$$J_q = \sum_{m \in I^*_{M_q}} \sum_{\alpha_k \in I_{K_q}} |R_{s_q}^{\alpha_k}(m)|^2$$

wherein $R_{s_q}^{\alpha_k}(m)$, $m \in I^*_{M_q}$ are the cyclic correlation coefficients of the signal $s_q(t)$, $I^*_{M_q}$ is said set of non-zero time shifts and $I_{K_q}$ is said set of cyclic frequencies relative to this signal. Advantageously, for each signal $s_q(t)$ to be analyzed, the cyclic correlation coefficients may be estimated from the samples $s_q(u)$ of this signal by:

$$\hat{R}_s^{\alpha_k}(m) = \frac{1}{U}\sum_{u=0}^{U-1} s(u+m)s^*(u)e^{2i\pi\alpha_k u}$$

wherein $\alpha_k$ is a cyclic frequency belonging to $I_K$ and m is a time shift expressed as a number of sampling periods.

SHORT DESCRIPTION OF THE DRAWINGS

Other features and advantages of the invention will become apparent upon reading a preferred embodiment of the invention made with reference to the appended figures wherein.

DETAILED DISCUSSION OF PARTICULAR EMBODIMENTS

Figure 1:
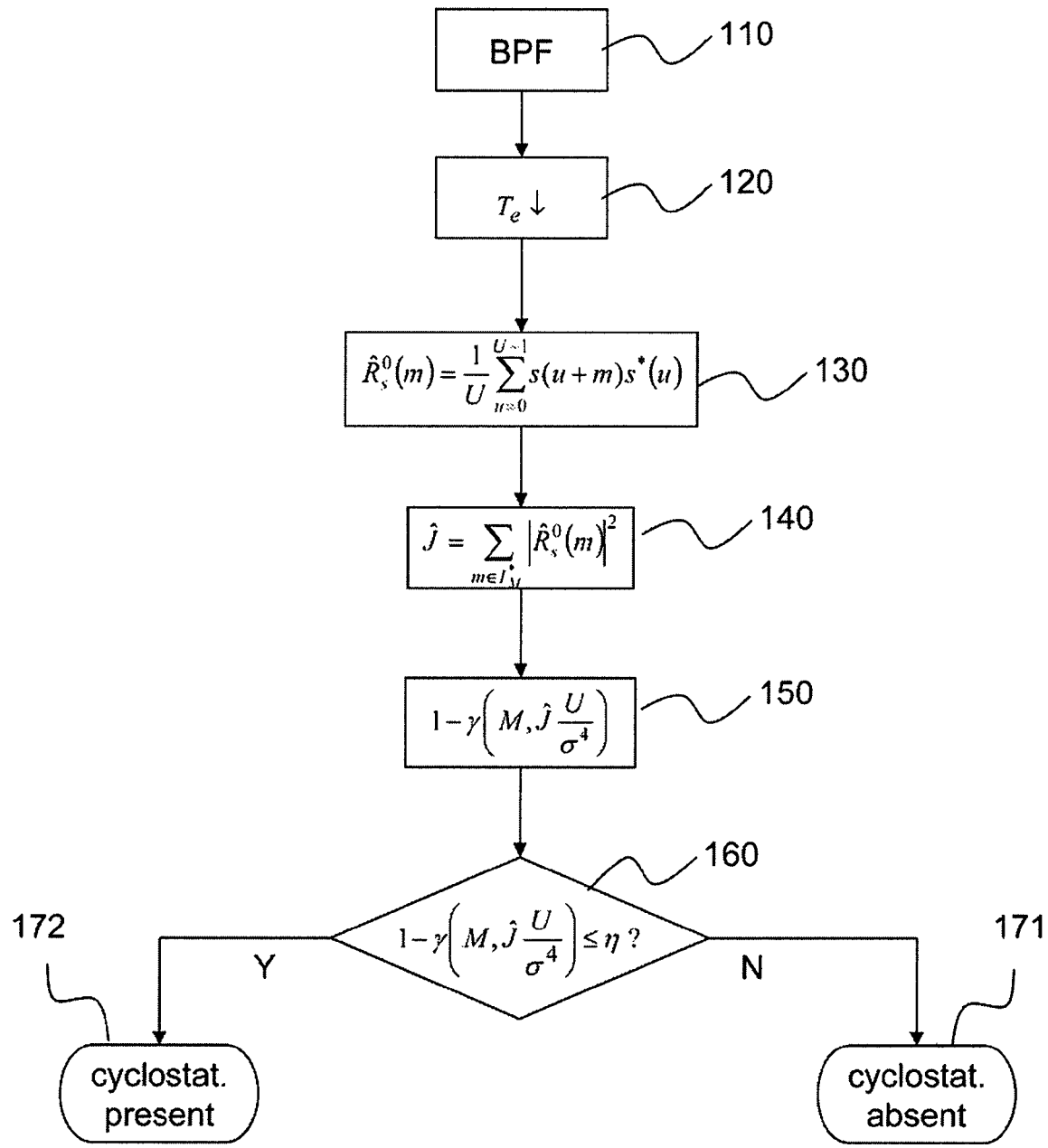
FIG. 1 illustrates a flow chart of the method for detecting a cyclostationary signal, according to a first embodiment of the invention.

We shall consider in the following the case of a cyclostationary signal buried in noise. Here we shall designate by cyclostationary signal (in the broad sense) a signal capable of being represented by a random function s(t) such that its autocorrelation function is defined by:

$$R_s(t,\tau) = E\{s(t)s^*(t-\tau)\} \qquad (1)$$

wherein $E\{\cdot\}$ designates the mathematical expectation and is a periodic function. In this case, the autocorrelation function may be developed as a Fourier series:

$$R_s(t, \tau) = \sum_k R_s^{\tilde{\alpha}_k}(\tau) e^{2i\pi\tilde{\alpha}_k t} \qquad (2)$$

wherein the complex coefficients $R_s^k(\tau)$ are called cyclic correlation coefficients and the real values $\tilde{\alpha}_k$ are called cyclic frequencies of the signal.

If one assumes the case of a cyclostationary signal with discrete time, the expression (2) becomes:

$$R_s(n, m) = \sum_k R_s^{\alpha_k}(m) e^{2i\pi\alpha_k n} \qquad (3)$$

wherein $t=nT_e$, $\tau=mT_e$ and $$\tilde{\alpha}_k = \frac{\alpha_k}{T_e}$$

where $T_e$ is the sampling period. In the following, we shall indifferently refer to either formulation without any loss of generality.

We shall consider in the following a signal to be analyzed, received from a transmitter by one or more receivers, or else a signal read from a recording medium, by one or more reading devices.

With the detection method according to the invention it is possible to determine with a given reliability level, i.e. equivalently, with a given wrong detection rate, whether a cyclostationary signal is present in the signal to be analyzed.

We shall assume in the following that the cyclostationary signal is buried in centred Gaussian white noise, with a very low signal-to-noise ratio, in other words said to be very negative when it is expressed in dB.

We shall conventionally denote $H_0$ the assumption according to which the signal to be analyzed only contains noise and $H_1$ the assumption according to which the signal to be analyzed contains a cyclostationary signal buried in this noise.

The detection method according to the invention advantageously uses a discrimination function defined as a quadratic form of the cyclic correlation coefficients of the signal to be analyzed, the coefficients being relative to a plurality of non-zero time shifts and a plurality of cyclic frequencies.

The discrimination function may assume the form of:

$$J = \sum_{m \in I_M^*} \sum_{\alpha_k \in I_K} |R_s^{\alpha_k}(m)|^2 \qquad (4)$$

wherein $I^*_M$ is a discrete set of non-zero time shift values of the autocorrelation function and $I_K$ is a discrete set of values of cyclic frequencies. If necessary, the set $I^*_M$ and/or the set $I_K$ may be reduced to a singleton. The notation will be M=card $(I^*_M)$ and K=card$(I_K)$.

Theoretically, when the signal to be analyzed does not have any cyclostationarity, i.e. when the hypothesis $H_0$ is assumed, the value of J is zero.

In practice, J is estimated by estimating the cyclic correlation coefficients in the time domain in the following way:

$$\hat{R}_s^{\alpha_k}(m) = \frac{1}{U} \sum_{u=0}^{U-1} s(u+m)s^*(u) e^{2i\pi\alpha_k u} \qquad (5)$$

wherein U is the observation time, also called the width of the autocorrelation window. The estimate $\hat{J}$ of J is then simply obtained by:

$$\hat{J} = \sum_{m \in I_M^*} \sum_{\alpha_k \in I_K} |\hat{R}_s^{\alpha_k}(m)|^2 \qquad (6)$$

When the estimate $\hat{J}$ is above a predetermined threshold $J_0$, it may be concluded that a cyclostationary signal is present in the signal to be analyzed. On the other hand, when the estimate $\hat{J}$ is less than this threshold, it may be concluded that the signal to be analyzed only contains noise.

We shall give hereafter a few non-limiting examples of a discrimination function when the cyclostationary signal is a spectrally spread-out signal or an OFDM signal.

Generally, a spectrally spread-out signal received from a transmitter by a receiver may be expressed in the following way:

$$s(t) = \sum_p a_p \sum_{l=0}^{L-1} c_l g(t - lT_c - pT_s) + b(t) \qquad (7)$$

wherein $c_l$, $l=0, \ldots, L-1$ is the spectral spreading sequence, $T_c$ is the chip period (chip), $T_s=LT_c$ is the symbol period, $a_p$, are the information symbols transmitted by the transmitter, g(t) is the convolution of the pulse for shaping a symbol by the impulse response of the path between the transmitter and the receiver, b(t) is a random function describing the noise.

Similarly an OFDM signal after base band demodulation in the receiver, may be written in the following form:

$$s(t) = \frac{\sqrt{E}}{N} \sum_k g(t - k(N+D)T_c)e^{2k\pi\Delta ft} \cdot \sum_{n=0}^{N-1} a_{n+kN} e^{2k\pi \frac{n}{NT_c}(t - DT_c - k(N+D)T_c)} \quad (8)$$

wherein E is the power of the signal, N is the number of carriers of the OFDM multiplex, $a_n$ are the information symbols belonging to a modulation alphabet, typically BPSK, QPSK or QAM, $1/T_c$ is the throughput of the information symbols, the inter-carrier interval having the value $1/NT_c$, D is the size of the cyclic prefix expressed as a fraction of the useful duration $T_u = NT_c$, g(t) is a pulse for shaping the OFDM symbols with a time support $[0, (N+D)T_c]$ intended to apodize the spectrum of the signal, $\Delta f$ is a carrier residue due to imperfection of the RF demodulation.

When the detection method according to the invention operates in a blind context, i.e. when no a priori information is available on the cyclostationary signal, which may be found buried in the noise, one then settles for calculating the discrimination function for the zero cyclic frequency. In other words, the set of the cyclic frequency is reduced to a singleton, $I_K = \{0\}$.

In order to blindly detect the presence of a spectrally spread-out signal buried in noise, it is possible to take as a set of time shift values, the set defined by:

$$I_M = \{-M_{max}, \ldots, -M_{min}\} \cup \{M_{min}, \ldots, M_{max}\}$$

wherein $M_{min}$ and $M_{max}$ are non-zero positive integers. Typically, $M_{min} = 1$ and $M_{max} = 10$.

In order to blindly detect an OFDM signal buried in noise, the singleton will be taken as a set of time shift values:

$$I_M = \left\{ \frac{T_u}{T_e} \right\}$$

wherein $T_u$ is the useful duration, and $T_e$ is the sampling period.

In a semi-blind context, the CDMA or OFDM signal to be analyzed will be sampled at its chip frequency, i.e.

$$\frac{1}{T_c}.$$

For a CDMA signal, for which the spectral spreading factor L is known, it is possible to respectively take as set of cyclic frequencies and set of time shifts:

$$I_K = \left\{ 0, \frac{1}{L}, \ldots, \frac{L-1}{L} \right\} \text{ and }$$

$$I_M = \{-M_{max}, \ldots, -M_{min}\} \cup \{M_{min}, \ldots, M_{max}\}$$

In a similar way, the case of the detection of an OFDM signal, it is possible to respectively take as a set of cyclic frequencies and a set of time shifts:

$$I_M = \left\{ \frac{T_u}{T_e} \right\} \text{ and } I_K = \left\{ -\frac{N}{D} + 1, \ldots, \frac{N}{D} - 1 \right\}$$

Returning to the general case, with the detection method according to the invention, it is advantageously possible to decide between the assumptions $H_1$ and $H_0$, in other words decide whether the signal to be analyzed either contains or does not contain a cyclostationary signal, this with a predetermined wrong detection rate.

It is possible to show, (see Annex I) that if the assumption $H_0$ is realized, the estimates $\hat{R}_s^{\alpha_k}$ of the cyclic correlation coefficients follow a centred Gaussian law with variance $$\frac{\sigma^4}{U}.$$

It may further be shown that (See Annex II), under the assumption, the respective estimates of two cyclic correlation coefficients $$\hat{R}_s^{\alpha_{k1}}(m_1) \text{ and } \hat{R}_s^{\alpha_{k2}}(m_2)$$

are decorrelated, i.e. they are such that $$E\{\hat{R}_s^{\alpha_{k1}}(m_1)(\hat{R}_s^{\alpha_{k2}}(m_2))^* \mid H_0\} = 0 \text{ if } m_1 \neq m_2.$$

On the other hand, if $m_1 = m_2$, the estimates of these coefficients, $$\hat{R}_s^{\alpha_{k1}}(m_1) \text{ and } \hat{R}_s^{\alpha_{k2}}(m_2),$$

are correlated.

We shall successively consider the case of a blind context and that of a semi-blind context.

In a blind context, the proposed discrimination function is reduced to:

$$\hat{J} = \sum_{m \in I_M^*} |\hat{R}_s^0(m)|^2 \quad (9)$$

because the cyclic frequencies of the cyclostationary signal which is sought, are not known a priori.

The estimate $\hat{J}$ is expressed as a sum of M centred Gaussian variables, its conditional probability intensity fits a $\chi^2$ law, i.e.:

$$Pr(\hat{J} \mid H_0) = \frac{U}{\sigma^4} \frac{1}{(M-1)! 2^M} \left( \hat{J} \frac{U}{\sigma^4} \right)^{M-1} e^{-(\hat{J} \frac{U}{\sigma^4})/2} \quad (10)$$

It is inferred therefrom that its distribution function is given by:

$$Pr(\hat{J} \leq \hat{J}_0 | H_0) = \gamma\left(M, \hat{J}_0 \frac{U}{\sigma^4}\right) \quad (11)$$

and, consequently, $$Pr(\hat{J} > \hat{J}_0 | H_0) = 1 - \gamma\left(M, \hat{J}_0 \frac{U}{\sigma^4}\right) \quad (12)$$

wherein $\gamma$ is the normalized lower incomplete gamma function, i.e.:

$$\gamma(M, x) = \frac{1}{(M-1)!} \int_0^x t^{M-1} e^{-t} dt \quad (13)$$

From the expression (12), it is seen that if:

$$1 - \gamma\left(M, \hat{J}_0 \frac{U}{\sigma^4}\right) \leq \eta \quad (14)$$

wherein $\eta$ is a predetermined wrong detection rate, it may be concluded that if $\hat{J} > \hat{J}_0$, the assumption $H_0$ is realized with a probability less than $\eta$. In other words, the probability of absence of cyclostationarity knowing that $\hat{J} > \hat{J}_0$ is equal to $\eta$.

FIG. 1 schematically illustrates the method for detecting a cyclostationary signal according to a first embodiment of the invention.

In step 110, the signal to be analyzed s(t) is filtered and then base band demodulated, if necessary.

The thereby filtered signal is sampled in 120 at the Nyquist frequency $$\frac{1}{T_e}.$$

In step 130, the cyclic coefficients of $R_s^0(m)$ are estimated by means of expression (5), i.e.:

$$\hat{R}_s^0(m) = \frac{1}{U} \sum_{u=0}^{U-1} s(u+m)s^*(u) \quad (15)$$

In step 140, the value of the discrimination function is estimated according to expression (9). This estimate is denoted $\hat{J}$.

In 150, the value of the expression $$1 - \gamma\left(M, \hat{J} \frac{U}{\sigma^4}\right)$$

is calculated and in 160 is compared with a predetermined poor (or false) detection rate $\eta$.

If this value is less than $\eta$, in 172, the conclusion is the presence of a cyclostationary signal. If not, in 171 the conclusion is the absence of cyclostationarity of the signal to be analyzed.

According to a second alternative embodiment, several versions $s_q(t)$, q=1, . . . , Q of a signal capable of containing a same cyclostationary signal are available. These different versions may be analyzed together in order to determine whether a cyclostationary signal is actually present or absent.

The signals to be analyzed may, depending on the case, be the signals received by the different receiving antennas of a SIMO (Single Input Multiple Output) system, the signals received by a plurality of sensors or further the signals read from a recording medium by means of a plurality of reader devices.

Figure 2:
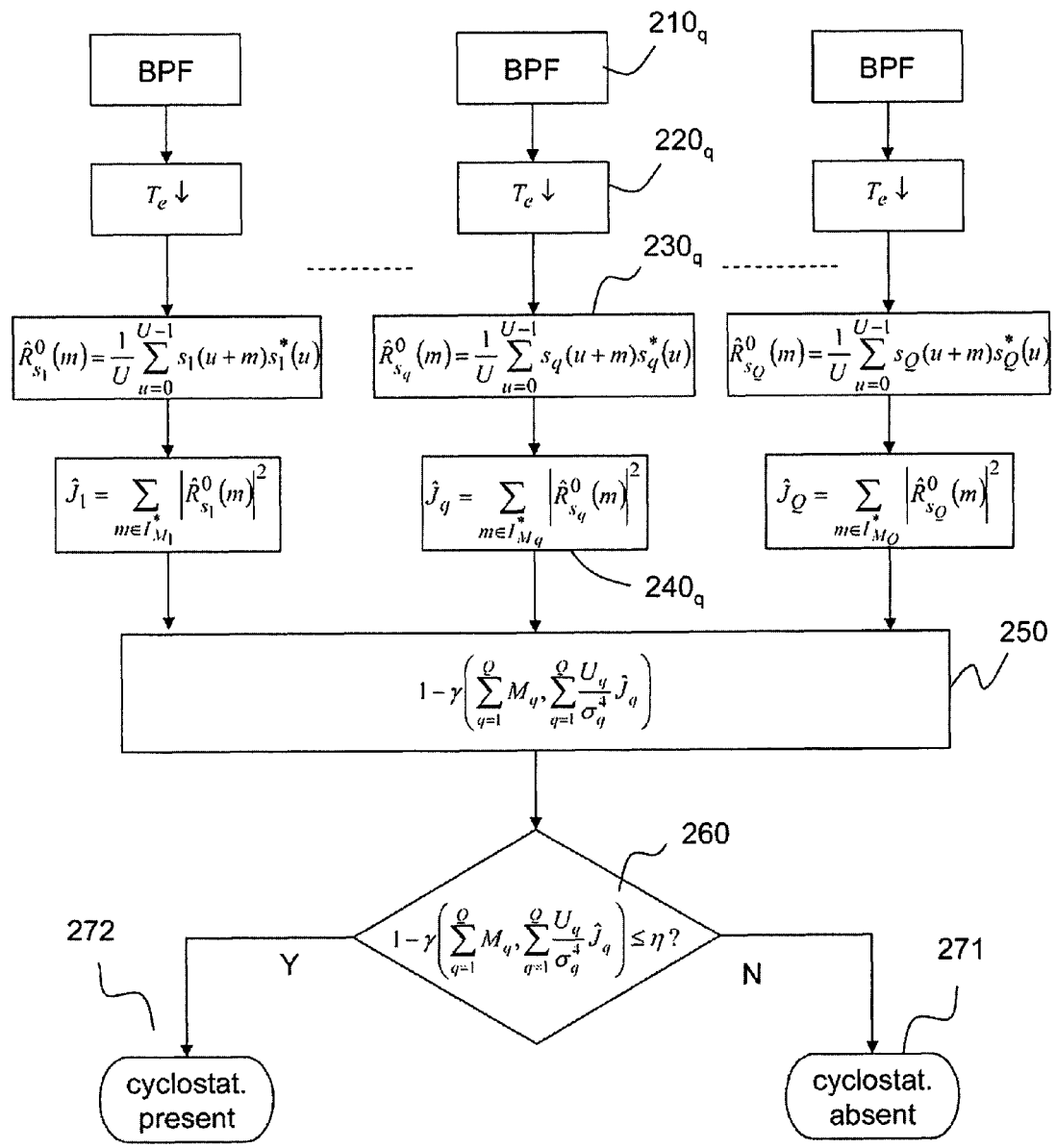
FIG. 2 illustrates a flow chart of the method for detecting a cyclostationary signal according to a second embodiment of the invention.

FIG. 2 schematically illustrates the method for detecting a cyclostationary signal according to a second embodiment of the invention. This embodiment uses a plurality Q of signals to be analyzed and comprises Q processing paths, each path q operating on a signal $s_q(t)$, and comprising steps 210$_q$-240$_q$ identical with the steps 110-140 of FIG. 1. In other words, with each path, it is possible to obtain an estimate $\hat{J}_q$ of the discrimination function $\hat{J}_q$ relatively to the signal $s_q(t)$. Unlike the first embodiment, a synthetic discrimination function is used:

$$J = \sum_{q=1}^{Q} \frac{U_q}{\sigma_q^4} J_q \quad (16)$$

wherein $M_q$, $U_q$ and $\sigma_q^4$ are the number of non-zero time shifts, the width of the autocorrelation window, and the square of the noise power relatively to this signal $s_q(t)$, respectively. The conditional distribution function is then the following:

$$Pr(\hat{J} > \hat{J}_0, q = 1, \ldots Q | H_0) = 1 - \gamma\left(\sum_{q=1}^{Q} M_q, \hat{J}_0\right) \quad (17)$$

Once the estimates $\hat{J}_q$ have been calculated in the steps 240$_q$, the value $$1 - \gamma\left(\sum_{q=1}^{Q} M_q, \sum_{q=1}^{Q} \frac{U_q}{\sigma_q^4} \hat{J}_q\right)$$

is calculated in 250 and compared in 260 with a predetermined wrong detection rate $\eta$.

Depending on whether this value is less than or larger than $\eta$, in 272 or in 271, the conclusion respectively is the presence or the absence of cyclostationarity in the signals to be analyzed.

We shall assume in the following that the detection method is used in a semi-blind context, i.e. the cyclic frequencies of the cyclostationary signal which is sought, are known a priori. In this case, the discrimination function is defined by (6) wherein $I_K$ is formed by the whole of these known frequencies.

As this has been seen earlier, the estimates of the cyclic correlation coefficients $$\hat{R}_s^{\alpha_{k_1}}(m_1) \text{ and } \hat{R}_s^{\alpha_{k_2}}(m_2)$$

are decorrelated if $m_1 \neq m_2$ and correlated for $m_1 = m_2$. In the latter case, the correlation coefficient of these coefficients has the value (cf. Annex II):

$$E\{\hat{R}_s^{\alpha_{k_1}}(m_1)(\hat{R}_s^{\alpha_{k_2}}(m_2))^* \mid H_0\} = \frac{\sigma^4}{U}\mu(\alpha_{k_1}, \alpha_{k_2}) \quad (18)$$

$$\text{with } \mu(\alpha_{k_1}, \alpha_{k_2}) = e^{i\pi(\alpha_{k_1} - \alpha_{k_2})(U-1)} \frac{\sin(\pi(\alpha_{k_1} - \alpha_{k_2})U)}{\sin(\pi(\alpha_{k_1} - \alpha_{k_2}))} \quad (18')$$

The vector $\hat{R}$ of size $v = MK$ of the estimates of the cyclic correlation coefficients is introduced:

$$\hat{R} = (\hat{R}_s^{\alpha_1}(m_1), \hat{R}_s^{\alpha_2}(m_1), \ldots, \hat{R}_s^{\alpha_K}(m_1), \ldots, \hat{R}_s^{\alpha_1}(m_M),$$
$$\hat{R}_s^{\alpha_2}(m_M), \ldots, \hat{R}_s^{\alpha_K}(m_M))^T$$

wherein $(.)^T$ designates the transposition operation. One then has:

$$\hat{J} = \|\hat{R}\|^2 \quad (19)$$

where $\|\hat{R}\|$ is the Euclidian norm of $\hat{R}$.

The correlation matrix of the vector $\hat{R}$ under the assumption $H_0$ is simply:

$$\Gamma = \frac{\sigma^4}{U}\tilde{A} \quad (20)$$

with:

$$\tilde{A} = \begin{pmatrix} A & 0 & \ldots & 0 \\ 0 & A & \ddots & 0 \\ \vdots & \ddots & \ddots & 0 \\ 0 & \ldots & 0 & A \end{pmatrix} \text{ and} \quad (21)$$

$$A = \begin{pmatrix} 1 & \mu(\alpha_1, \alpha_2) & \ldots & \mu(\alpha_1, \alpha_K) \\ \mu(\alpha_1, \alpha_2)^* & 1 & \ddots & \mu(\alpha_2, \alpha_K) \\ \vdots & \ddots & \ddots & \vdots \\ \mu(\alpha_1, \alpha_K)^* & \mu(\alpha_2, \alpha_K)^* & \ldots & 1 \end{pmatrix}$$

It will be noted that the correlation matrix $\Gamma$, of size $v \times v$ is diagonal blockwise since the estimates of the cyclic coefficients are decorrelated for distinct time shifts.

The detection method in a semi-blind context uses a modified discrimination function, the cyclic correlation coefficients of which are whitened, in other words decorrelated, i.e.:

$$\hat{J}^{whit} = \left\|\tilde{A}^{-\frac{1}{2}}\hat{R}\right\|^2 \quad (22)$$

This thus boils down to a quadratic sum of centred Gaussian random variables. Similarly to the blind case, the $\hat{J}^{whit}$ distribution function is considered:

$$Pr(\hat{J}^{whit} \leq \hat{J}_0 \mid H_0) = \gamma\left(v, \hat{J}_0 \frac{U}{\sigma^4}\right) \quad (23)$$

and subsequently:

$$Pr(\hat{J}^{whit} > \hat{J}_0 \mid H_0) = 1 - \gamma\left(v, \hat{J}_0 \frac{U}{\sigma^4}\right) \quad (24)$$

The detection method compares $$1 - \gamma\left(v, \hat{J}_0 \frac{U}{\sigma^4}\right)$$

with a predetermined wrong detection rate $\eta$ and infers therefrom whether the assumption $H_0$ or the assumption $H_1$ is confirmed with a maximum error rate $\eta$.

Figure 3:
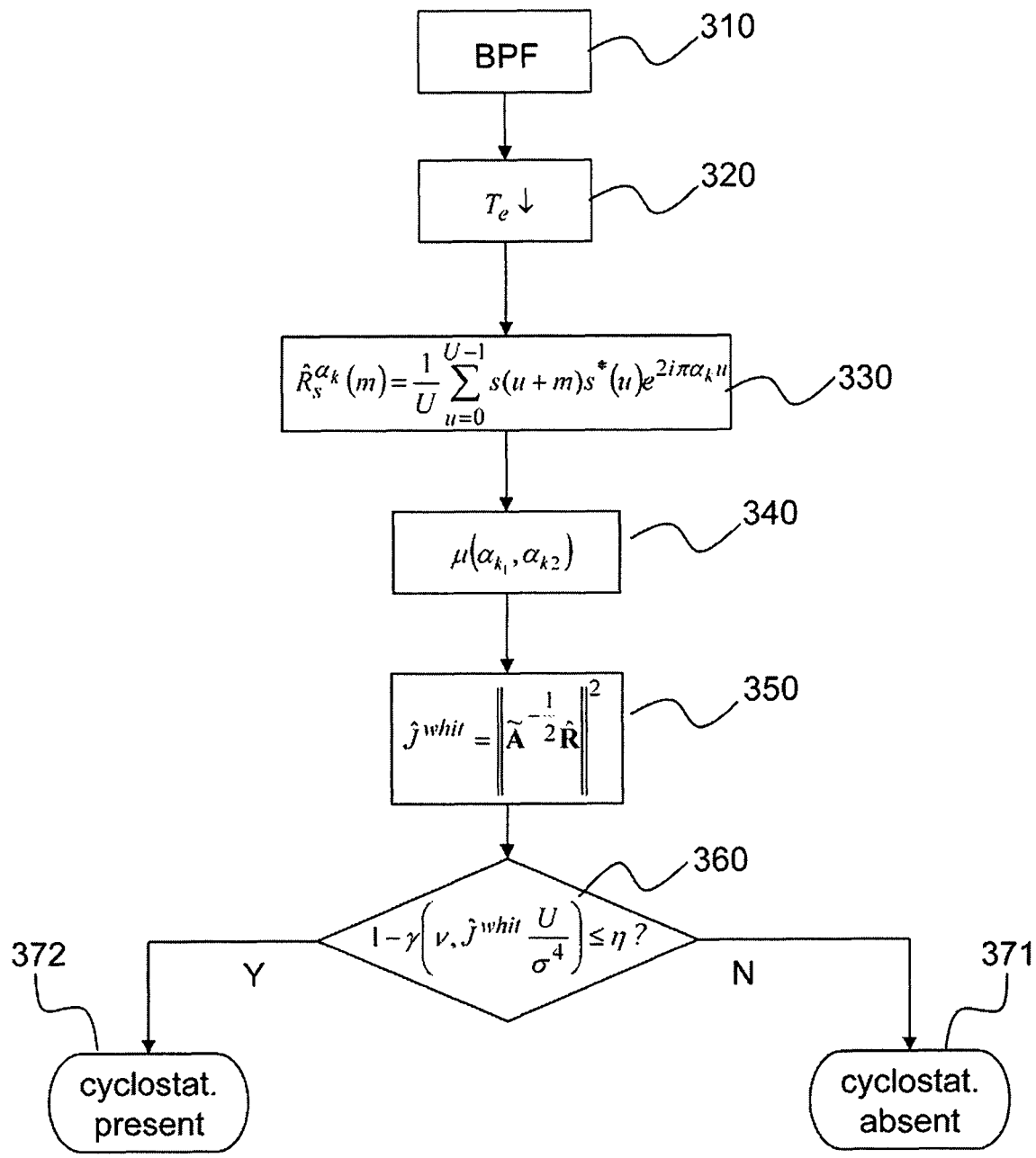
FIG. 3 illustrates a flow chart of the method for detecting a cyclostationary signal, according to a third embodiment of the invention.

FIG. 3 schematically illustrates the stationarity detection method according to a third embodiment of the invention.

After having been possibly filtered and baseband-demodulated in step 310, the signal to be analyzed s(t) is sampled at a frequency of $$\frac{1}{T_e},$$

depending on the spectral characteristics of the signal. For example, if the signal is a spectrally spread-out signal or an OFDM signal, the sampling frequency will be none other than the chip frequency $$\frac{1}{T_c}.$$

In step 320, the cyclic correlation coefficients are then estimated from expression (5), this for a set $I_K$ of known cyclic frequencies and a set of time shifts $I^*_M$.

The coefficients $\mu(\alpha_{k_1}, \alpha_{k_2})$ of the matrix A are then calculated in step 330. Given that A is Hermitian and that its diagonal consists of 1 s, only $$\frac{K(K-1)}{2}$$

coefficients have to be calculated.

In step 340, the whitened correlation coefficients $$\tilde{A}^{-\frac{1}{2}}\hat{R}$$

are calculated and in 350 the estimated value of the modified discrimination function $\hat{J}^{whit}$ is obtained by means of the expression (22).

In the following step 360, the value of $$1 - \gamma\left(v, \hat{J}^{whit} \frac{U}{\sigma^4}\right),$$

is inferred therefrom, a value which is then compared in 370 with a predetermined error rate $\eta$.

Depending on whether said value is less than or larger than $\eta$, the conclusion is in 382, the presence or, in 381 the absence of a cyclostationary signal.

It will be noted that according to expression (18') that if the condition:

$$\max_{k_1 \neq k_2} |\alpha_{k_1} - \alpha_{k_2}| \gg \frac{1}{U} \quad (25)$$

is met, in other words if the autocorrelation window is sufficiently wide, the estimates of the cyclic correlation coefficients are decorrelated and the correlation matrix is reduced to $$\Gamma = \frac{\sigma^4}{U} I_{v \times v}$$

wherein $I_{v \times v}$ is the unit matrix of size $v \times v$. In this case, the calculation steps 330 and 340 are unnecessary.

Figure 4:
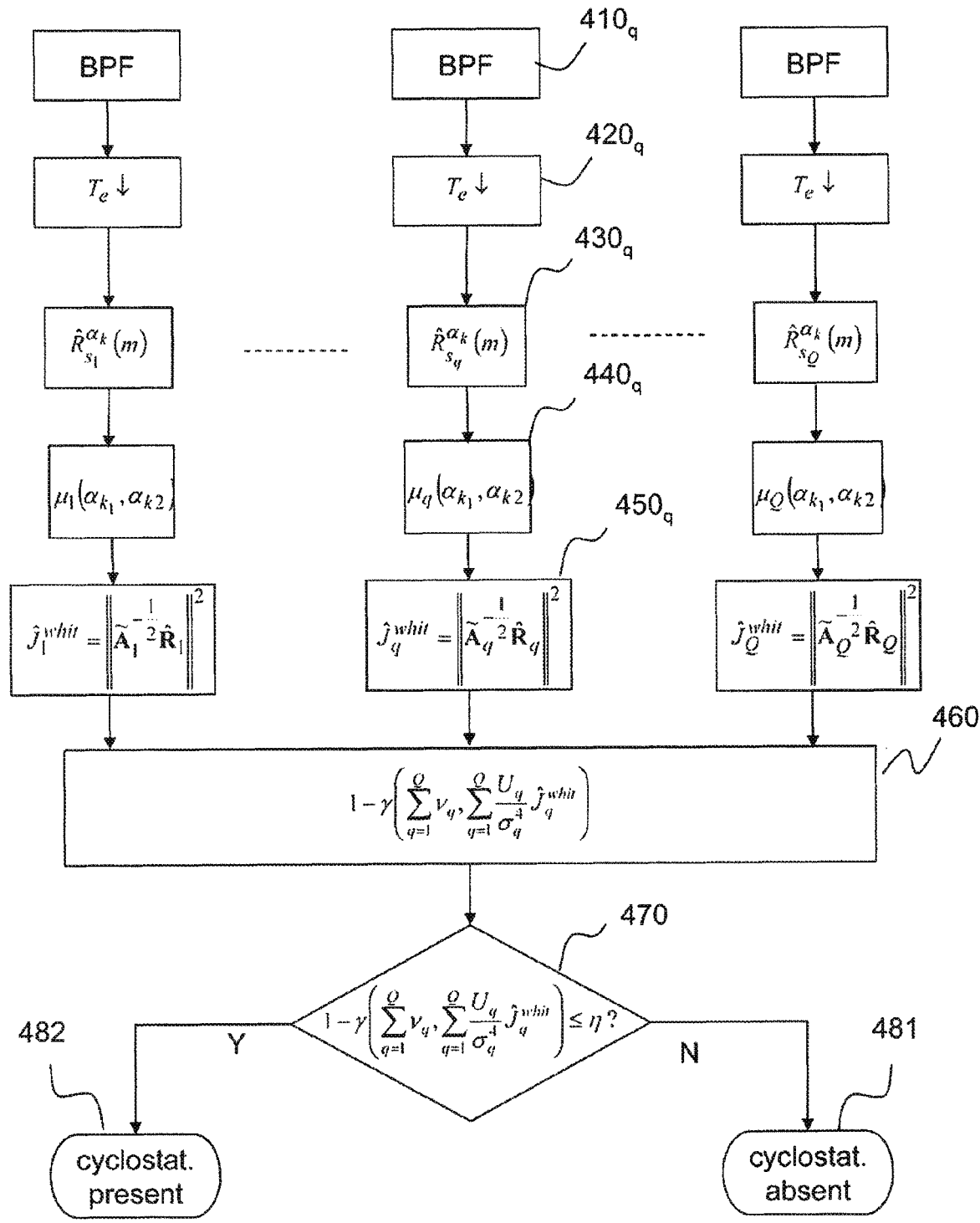
FIG. 4 illustrates a flow chart of the method for detecting a cyclostationary signal according to a fourth embodiment of the invention.

FIG. 4 schematically illustrates the method for detecting a cyclostationary signal according to a fourth embodiment of the invention. This embodiment uses a plurality Q of signals to be analyzed and comprises Q processing paths. The signals to be analyzed may be as for the second embodiment, signals received by the various receiving antennas of an SIMO (Single Input Multiple Output) system, the signals received by a plurality of sensors or further the signals read from a recording medium by means of a plurality of reading devices.

Each processing path q comprises a plurality of steps 410$_q$-450$_q$ identical with steps 310-350 of FIG. 3. In particular, each of the steps 450$_q$ provides an estimate $\hat{J}_q^{whit}$ of the value of the discrimination function for the signal $s_q(t)$, i.e.

$$\hat{J}_q^{whit} = \left\| \tilde{A}_q^{-\frac{1}{2}} R_q \right\|^2$$

wherein $R_q$ is the vector of size $v_q$ consisting of the cyclic correlation coefficients $R_{s_q}^{\alpha_k}(m)$ for non-zero time shifts and the cyclic frequencies of the signal $s_q(t)$, and $$\tilde{A}_q = \frac{U_q}{\sigma_q^4} \Gamma_q$$

wherein $\Gamma_q$ is the correlation matrix of these coefficients.

Unlike the third embodiment, the value of:

$$1 - \gamma\left(\sum_{q=1}^{Q} v_q, \sum_{q=1}^{Q} \frac{U_q}{\sigma_q^4} \hat{J}_q^{whit}\right) \quad (26)$$

is calculated in step 460, $v_q = M_q K_q$, wherein $M_q$ and $K_q$ respectively are the number of time shifts and the number of cyclic frequencies relative to the signal $s_q(t)$; $U_q$ and $\sigma_q^4$ are the width of the autocorrelation window and the square of the noise power relative to this same signal, respectively.

The value of $$1 - \gamma\left(\sum_{q=1}^{Q} v_q, \sum_{q=1}^{Q} \frac{U_q}{\sigma_q^4} \hat{J}_q^{whit}\right)$$

is then compared in 470 with a predetermined wrong detection rate $\eta$.

According to whether this value is less than or larger than $\eta$, the conclusion as earlier is the presence in 482 or the absence in 481 of cyclostationarity in the signals to be analyzed.

The previous note concerning the decorrelation of the cyclic correlation coefficients is also applied here. By choosing U to be sufficiently large, the correlation matrices (or only some of them) are reduced to $$\Gamma_q = \frac{\sigma^4}{U} I_{v_q \times v_q}$$

wherein $I_{v_q \times v_q}$ is the unit matrix of size $v_q \times v_q$. The calculation steps 330$_q$ and 340$_q$ are then unnecessary.

Annex I

The cyclic correlation coefficients may be estimated by:

$$\hat{R}_s^{\alpha_k}(m) = \frac{1}{U} \sum_{u=0}^{U-1} s(u+m)s^*(u)e^{2i\pi\alpha_k u}.$$

The hypothesis $H_0$ is assumed, in other words the s(u) are independent and identically distributed (i.i.d.) noise random variables.

According to the central limit theorem, $\hat{R}_s^{\alpha_k}(m)$ tends in law towards a Gaussian probability density when U tends to infinity. Its mean $E\{\hat{R}_s^{\alpha_k}(m)\}$ tends towards $\hat{R}_s^{\alpha_k}(m)=0$ for $m \neq 0$.

The moment of order 4 of s(u) is expressed as a function of the cumulant of order 4:

$$E\{s(u_1+m)s^*(u_1)s^*(u_2+m)s(u_2)\} = cum(s(u_1+m)s^*(u_1)s^*(u_2+m)s(u_2)) + $$
$$E\{s(u_1+m)s^*(u_1)\}E\{s^*(u_2+m)s(u_2)\} + E\{s(u_1+m)s(u_2)\}E$$
$$\{s^*(u_1)s^*(u_2+m)\} + E\{s(u_1+m)s^*(u_2+m)\}E\{s^*(u_1)s(u_2)\}$$

The noise being Gaussian:

$$cum(s(u_1+m)s^*(u_1)s^*(u_2+m)s(u_2))=0$$

The noise being circular, i.e. its phase being equidistributed over $[0, 2\pi]$, one has:

$$E\{s(u_1+m)s(u_2)\}E\{s^*(u_1)s^*(u_2+m)\}=0$$

Consequently, the asymptotic variance is expressed from the $2^{nd}$ and $4^{th}$ terms:

$$\lim_{U\to\infty}\left(E\{|\hat{R}_s^{\alpha_k}(m)|^2\}\right) = \lim_{U\to\infty}\frac{1}{U^2}$$

$$\sum_{u_1=0}^{U-1} E\{s(u_1+m)s^*(u_1)\}e^{-2i\pi\alpha_k u_1}\sum_{u_2=0}^{U-1}E\{s^*(u_2+m)s(u_2)\}e^{2i\pi\alpha_k u_2} +$$

$$\lim_{U\to\infty}\frac{1}{U^2}\sum_{u_1=0}^{U-1}\sum_{u_2=0}^{U-1}E\{s(u_1+m)s^*(u_2+m)\}E\{s^*(u_1)s(u_2)\}e^{-2i\pi\alpha_k(u_1-u_2)}$$

The first term tends to $|R_s^{\alpha_k}(m)|^2=0$ when U tends to infinity.

The second term is non-zero if and only if, $u_1=u_2$ and in this case, since $E\{|s(u)|^2\}=\sigma^2$, the second term tends to $$\frac{\sigma^4}{U}$$

(only U factors are non-zero under the summation sign).

Annex II

We shall show in this Annex that two cyclic correlation coefficients $$\hat{R}_s^{\alpha_{k_1}}(m_1) \text{ and } \hat{R}_s^{\alpha_{k_2}}(m_2)$$

are decorrelated if $m_1 \neq m_2$. Otherwise, if $m_1 = m_2$, both of these coefficients are correlated.

One has:

$$\lim_{U\to\infty}\left(E\{\hat{R}_s^{\alpha_{k_1}}(m_1)(\hat{R}_s^{\alpha_{k_2}}(m_2))^*\}\right) =$$

$$\lim_{U\to\infty}\frac{1}{U^2}E\left\{\sum_{u_1=0}^{U-1}\sum_{u_2=0}^{U-1}E\{s(u_1+m)s^*(u_1)s^*(u_2+m)s(u_2)\}e^{-2i\pi(\alpha_{k_1}u_1-\alpha_{k_2}u_2)}\right\}$$

In the same way as in Annex I, this moment of order 4 may be expressed as a function of the cumulant and of products of moments of order 2. The cumulant is cancelled out, a term is zero because of the circularity of the noise, one term tends to $$E\{R_s^{\alpha_{k_1}}(m_1) \text{ and } (R_s^{\alpha_{k_2}}(m_2))^*\} = 0.$$

Finally, only the following term remains:

$$\lim_{U\to\infty}\left(E\{\hat{R}_s^{\alpha_{k_1}}(m_1)(\hat{R}_s^{\alpha_{k_2}}(m_2))^*\}\right) = \lim_{U\to\infty}\frac{1}{U^2}E$$

$$\left\{\sum_{u_1=0}^{U-1}\sum_{u_2=0}^{U-1}E\{s(u_1+m_1)s^*(u_2+m_2)\}E\{s^*(u_1)s(u_2)\}e^{-2i\pi(\alpha_{k_1}u_1-\alpha_{k_2}u_2)}\right\}$$

Given that the noise is decorrelated, $E\{s(u_1+m_1)s^*(u_2+m_2)\}=0$, if $m_1 \neq m_2$. Consequently, in this case $$\lim_{U\to\infty}\left(E\{\hat{R}_s^{\alpha_{k_1}}(m_1)(\hat{R}_s^{\alpha_{k_2}}(m_2))^*\}\right) = 0.$$

On the other hand if $m_1 = m_2$, one has:

$$\lim_{U\to\infty}\left(E\{\hat{R}_s^{\alpha_{k_1}}(m_1)(\hat{R}_s^{\alpha_{k_2}}(m_2))^*\}\right) =$$

$$\frac{\sigma^4}{U}\sum_{u=0}^{U-1}e^{-2i\pi(\alpha_{k_1}u_1-\alpha_{k_2}u_2)} = \frac{\sigma^4}{U}e^{-i\pi(\alpha_{k_1}u_1-\alpha_{k_2}u_2)(U-1)}\frac{\sin(\pi(\alpha_1-a_{k_2})U)}{\sin(\pi(\alpha_1-a_{k_2}))}$$

The coefficients $$\hat{R}_s^{\alpha_{k_1}}(m_1) \text{ and } \hat{R}_s^{\alpha_{k_2}}(m_2)$$

are therefore actually correlated.

The invention claimed is:

1. A method for detecting a cyclostationary signal in a signal to be analyzed, comprising:

receiving from a transmitter by a receiver, or reading from a recording medium by a reading device, said signal to be analyzed, characterized by:

estimating the value of a discrimination function J, said discrimination function being expressed as a quadratic form of the cyclic correlation coefficients of the signal to be analyzed for a set ($I^*_M$) of non-zero time shifts and a set ($I_K$) of cyclic frequencies;

comparing the value $$1 - \gamma\left(v, \frac{U}{\sigma^4}J\right)$$

with a false detection rate η, where γ(v,x) is the normalized lower incomplete gamma function, v is the product of the cardinal (M) of said set of non-zero time shifts and of the cardinal (K) of said set of cyclic frequencies, U is the width of the auto correlation window on which the cyclic correlation coefficients are calculated, and $\sigma^4$ is the square of the noise variance;

indicating whether said cyclostationary signal is present in said signal to be analyzed, depending upon the result of this comparison.

2. The detection method according to claim 1, characterized in that said set of cyclic frequencies is reduced to the zero frequency and that the value of the discrimination function is calculated by:

$$J = \sum_{m \in I^*_M} |R_s^0(m)|^2$$

wherein $R_s^0(m)$ is the value of the autocorrelation function of the signal to be analyzed for a non-zero time shift $m \in I^*_M$, and $I^*_M$ being said set of non-zero time shifts.

3. The detection method according to claim 2, characterized in that said value of the autocorrelation function is estimated from the samples s(u) of the signal to be analyzed by:

$$\hat{R}_s^0(m) = \frac{1}{U}\sum_{u=0}^{U-1} s(u+m)s^*(u)$$

wherein U is the width of the autocorrelation window and m is a time shift expressed as a number of sampling periods.

4. The detection method according to claim 1, characterized in that the discrimination function is calculated by:

$$J = \left\| \tilde{A}^{-\frac{1}{2}} R \right\|^2$$

wherein R is the vector of size ν consisting of the cyclic correlation coefficients $R_s^{\alpha_k}(m)$ for said non-zero time shifts and said cyclic frequencies, and $\tilde{A}$ is a matrix proportional to the correlation matrix of these coefficients.

5. The detection method according to claim 1, characterized in that the discrimination function is calculated by:

$$J = \sum_{m \in I_M^*} \sum_{\alpha_k \in I_K} |R_s^{\alpha_k}(m)|^2$$

wherein $R_s^{\alpha_k}(m)$, $m \in I_M^*$ are the cyclic correlation coefficients, $I_M^*$ is said set of non-zero time shifts and $I_K$ is said set of cyclic frequencies.

6. The detection method according to claim 4, characterized in that the cyclic correlation coefficients are estimated from the samples s(u) of the signal to be analyzed by:

$$\hat{R}_s^{\alpha_k}(m) = \frac{1}{U}\sum_{u=0}^{U-1} s(u+m)s^*(u)e^{2i\pi\alpha_k u}$$

wherein $\alpha_k$ is a cyclic frequency belonging to $I_K$ and m is a time shift, expressed as a number of sampling periods.

7. The detection method of a cyclostationary signal in a plurality Q of signals to be analyzed ($s_q(t)$), comprising:
receiving from a transmitter by a plurality of receivers, or reading from a recording medium by a plurality of reader devices, said plurality of signals to be analysed;
characterized by:
estimating, for each of said signals to be analyzed, the value of a discrimination function $J_q$ said discrimination function being, expressed as a quadratic form of the cyclic correlation coefficients of this signal for a set ($I^*_{M_q}$) of non-zero time shifts and a set ($I_{K_q}$) of cyclic frequencies;
comparing the value $$1 - \gamma\left(\sum_{q=1}^{Q} v_q, \sum_{q=1}^{Q} \frac{U_q}{\sigma_q^4} J_q\right)$$

compared with a false detection rate η, where γ(ν, x) is the normalized lower incomplete gamma function, $v_q$ is the product of the cardinal ($M_q$) of said set of non-zero time shifts and of the cardinal ($K_q$) of said set of cyclic frequencies for the signal to be analyzed $s_q(t)$, $U_q$ is the width of the autocorrelation window on which the cyclic correlation coefficients are calculated and $\sigma_q^4$ is the square of the noise variance, relative to the signal to be analyzed;
indicating whether said cyclostationary signal is present in said signals to be analyzed, depending upon the result of this comparison.

8. The detection method according to claim 7, characterized in that for each of said signals to be analyzed, said set of cyclic frequencies is reduced to the zero frequency and the value of the discrimination function is calculated for this signal by:

$$J_q = \sum_{m \in I_{M_q}^*} |R_{s_q}^0(m)|^2$$

wherein $R_{s_q}^0(m)$ is the value of the autocorrelation function of the signal to be analyzed $s_q(t)$, for a non-zero time shift $m \in I^*_{M_q}$, $I^*_{M_q}$ being said set of non-zero time shifts for this signal.

9. The detection method according to claim 8, characterized in that for each of said signals to be analyzed, said value of the autocorrelation function is estimated from the samples s(u) of this signal by:

$$\hat{R}_{s_q}^0(m) = \frac{1}{U}\sum_{u=0}^{U-1} s(u+m)s_q^*(u)$$

wherein U is the width of the autocorrelation window and m is a time shift expressed as a number of sampling periods.

10. The detection method according to claim 7, characterized in that for each signal $s_q(t)$ to be analyzed, the discrimination function is calculated by:

$$J_q = \left\| \tilde{A}_q^{-\frac{1}{2}} R_q \right\|^2$$

wherein $R_q$ is the vector of size $v_q$ consisting of the cyclic correlation coefficients $R_{s_q}^{\alpha_k}(m)$ for said non-zero time shifts and said cyclic frequencies, and $\tilde{A}_q$ is a matrix proportional to the correlation matrix of these coefficients.

11. The detection method according to claim 7, characterized in that, for each signal $s_q(t)$ to be analyzed, the discrimination function is calculated by:

$$J_q = \sum_{m \in I_{M_q}^*} \sum_{\alpha_k \in I_{K_q}} |R_{s_q}^{\alpha_k}(m)|^2$$

wherein $R_{s_q}^{\alpha_k}(m)$, $m \in I^*_{M_q}$ are the cyclic correlation coefficients of the signal $s_q(t)$, $I^*_{M_q}$ is said set of non-zero time shifts and $I_{K_q}$ is said set of cyclic frequencies relative to this signal.

12. The detection method according to claim 10, characterized in that, for each signal $S_q(t)$ to be analyzed, the cyclic correlation coefficients are estimated from the samples $s_q(u)$ of this signal by:

$$\hat{R}_s^{\alpha_k}(m) = \frac{1}{U} \sum_{u=0}^{U-1} s(u+m) s^*(u) e^{2i\pi\alpha_k u}$$

wherein $\alpha_k$ is a cyclic frequency belonging to $I_K$ and m is a time shift, expressed as a number of sampling periods.

* * * * *